(12) United States Patent
Sun et al.

(10) Patent No.: US 7,894,380 B2
(45) Date of Patent: Feb. 22, 2011

(54) TERMINAL POWER CONTROL METHOD

(75) Inventors: Jianxun Sun, Shanghai (CN); Yong Fan, Shanghai (CN); Tiezhu Xu, Shanghai (CN); Gang Niu, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 687 days.

(21) Appl. No.: 11/915,114

(22) PCT Filed: May 15, 2006

(86) PCT No.: PCT/CN2006/000965
§ 371 (c)(1),
(2), (4) Date: Jan. 18, 2008

(87) PCT Pub. No.: WO2006/122488
PCT Pub. Date: Nov. 23, 2006

(65) Prior Publication Data
US 2008/0212548 A1    Sep. 4, 2008

(30) Foreign Application Priority Data
May 20, 2005   (CN) .................. 2005 1 0071187

(51) Int. Cl.
*H04B 7/216* (2006.01)
*H04W 4/00* (2009.01)
(52) U.S. Cl. .................. 370/320; 370/332; 370/335; 370/342
(58) Field of Classification Search .......... 370/320, 370/332, 335, 342
See application file for complete search history.

(56) References Cited

U.S. PATENT DOCUMENTS 5,603,096 A    2/1997   Gilhousen et al. .............. 455/69

(Continued)

FOREIGN PATENT DOCUMENTS

CN    1152384    6/1997

(Continued)

OTHER PUBLICATIONS

PCT International Search Report based on PCT/CN2006/000965 dated Aug. 16, 2007.

*Primary Examiner*—Huy D Vu
*Assistant Examiner*—Brandon Renner
(74) *Attorney, Agent, or Firm*—Greenberg Traurig, LLP; David J. Dykeman; Danielle T. Abramson

(57) ABSTRACT

A power control method for a terminal, including: obtaining, by the terminal, a quality parameter of a received signal, a receiving power of a code channel occupied by the terminal and a power of code channels in a cell having the same carrier frequency and the same time slot as those of the code channel occupied by the terminal respectively, according to a received signal quality; determining the minimum receiving power which is permitted by the code channel occupied by the terminal according to the power of the code channels in the cell having the same carrier frequency and the same time slot as those of the code channel occupied by the terminal; and generating a power control command according to a determined minimum receiving power, the receiving power of the code channel occupied by the terminal and the quality parameter of the received signal.

8 Claims, 4 Drawing Sheets

U.S. PATENT DOCUMENTS

| | | |
|---|---|---|
| 5,812,938 A | 9/1998 | Gilhousen et al. ............. 455/69 |
| 6,377,813 B1 | 4/2002 | Kansakoski et al. ......... 455/522 |
| 6,654,358 B1 | 11/2003 | Park et al. .................. 370/318 |
| 7,133,380 B1 * | 11/2006 | Winters et al. .............. 370/329 |
| 2002/0054578 A1 * | 5/2002 | Zhang et al. ................ 370/328 |
| 2004/0004944 A1 * | 1/2004 | Petrus et al. ................ 370/318 |
| 2004/0252668 A1 * | 12/2004 | Ozukturk et al. ............ 370/335 |
| 2006/0040696 A1 * | 2/2006 | Lin ............................ 455/522 |
| 2006/0099984 A1 * | 5/2006 | Brusch et al. ............... 455/522 |

FOREIGN PATENT DOCUMENTS

| | | |
|---|---|---|
| CN | 1273715 | 11/2000 |

* cited by examiner

TERMINAL POWER CONTROL METHOD

RELATED APPLICATIONS

This application is a national phase filing under 35 U.S.C. 371 of International Application No. PCT/CN2006/000965, filed on May 15, 2006, and claims the benefit of Chinese Application Number 200510071187.5, filed May 20, 2005, the entirety of these applications are hereby incorporated herein by reference for the teachings therein.

FIELD OF THE INVENTION

The present invention relates to the field of mobile communications, in particular, to a terminal power control method.

BACKGROUND OF THE INVENTION

A CDMA (Code Division Multiple Access) system is a self-interfering system, wherein a transmit power of a mobile station is an interference to other users occupying the same frequency in the cell, and a Near-Far Effect is a predominant problem. The so called Near-Far Effect refers to that, when mobile phones with different distances from the base station are used simultaneously, a signal with a higher power and nearer to the base station will suppress a signal with a lower power and farther from the base station. Therefore, it is expected to make the transmit power of each mobile station maintain a minimum level to meet the requirement for communication as far as possible, and to make the mobile station obtain a basically same power on the base station side regardless of the distance from the base station and the channel condition. A power control technology is a technology to overcome the Near-Far Effect for the CDMA system. It may decrease an average transmit power and reduce an inter-system and an intra-system interference.

The power control may be divided into an open loop type and a closed-loop type, wherein the closed-loop type power control may be further divided into an outer-loop power control and an inner-loop power control. Usually, the outer-loop sets target values (such as a received power target value and a signal-to-noise ratio target value, etc.) according to the quality of the service such as BER (Bit Error Rate) and BLER (Block Error Rate). The inner-loop adjusts the transmit power according to a comparison result between the signal quality and the target value set by the outer-loop.

According to directions of the link, the power control may also be divided into an uplink (backward) power control and a downlink (forward) power control.

In a conventional downlink power control algorithm, only the quality of signal received by the terminal is considered, while the power difference in signals is not considered. Taking the inner-loop downlink power control as an example, the inner-loop downlink power control is accomplished by the base station with the assistance of a terminal. The terminal measures the signal quality (such as the received power or the signal-to-noise ratio) and compares the signal quality with the target value. If the signal quality is greater than the target value, a command for decreasing the transmit power is generated; otherwise, a command for increasing the transmit power is generated. If the transmit power needs not to be changed, in other words, if it is allowed that the transmit power is not adjusted when the signal quality is in a certain range around the target value, then in the above determination process, it is determined that the command for decreasing the transmit power is generated when the signal quality is greater than the target value by a certain threshold and the command for increasing the transmit power is generated when the signal quality is less than the target value by a certain threshold; otherwise, a command for not changing the transmit power is generated. Then, the control command is sent to the base station via a control channel or in other ways, and the base station performs a corresponding adjustment in a designated or predefined step size according to the received control command, so that the base station may keep an ideal transmit power.

In a practical wireless communication system, in the direction of the downlink, because the distances from different terminals to the base station are different, the required transmit powers meeting the quality of the service are also different. Usually, the transmit power of the base station needed by the terminal farther from the base station is higher, and the transmit power of the base station needed by the terminal nearer to the base station is lower. If the base station does not employ the downlink power control technology, the transmit power of the base station for each terminal is the same, and no Near-Far Effect exists. However, the transmit power of the base station must be configured according to the coverage area or the terminal farthest from the base station, thus great power will be wasted, the inter-system interference will be increased, and the system capacity will be limited. If the downlink power control technology is employed, the transmit power of the base station for each terminal will be different, thus the Near-Far Effect may occur. If the difference between the transmit powers is too great, a signal with low power may be submerged in a signal with high power at any moment, and the stability of the wireless link will be influenced, thus the quality of communication may not be guaranteed. However, the power difference between signals may also be resolved or overcome in other technical solutions, such as the joint detection technology. Theoretically, ideal joint detection may completely overcome the Near-Far Effect. However, it is difficult to be implemented in practice. In the prior system, it usually employs a suboptimal joint detection algorithm or a joint detection algorithm simplified according to a certain model hypothesis, thus, the ability to overcome Near-Far Effect is limited. Too large power difference will degrade the demodulation performance.

Thus it can be seen that in the downlink power control algorithm, the terminal does not consider the power difference between different signals, therefore, it is adverse to guarantee the communication quality of the system.

Optionally, the limitation on the transmit power difference between all the code channels of the same carrier frequency and the same time slot (for a time-division system) may also be implemented in the base station. But in the existing protocol, the power difference between code channels is not limited; in other words, the base stations of different manufacturers may not consider the difference between all the code channels of the same carrier frequency and the same time slot (for a time-division system). Therefore, the power for receiving signals of the terminal belonging to the base station and being nearer to the base station may be much lower than that of other terminal or terminals. As a result, the demodulation performance of the terminal may be degraded and the wireless link may be unstable and easy to be broken and so on. Therefore, the quality of the communication cannot be guaranteed.

SUMMARY OF THE INVENTION

Therefore, an object of the present invention is to provide a terminal power control method, so that disadvantages of the prior art, such as the terminal demodulation performance is degraded and the wireless link becomes unstable when the power difference between users is too large, may be overcome. Thus, the quality of system communication may be guaranteed.

The present invention provides a terminal power control method, including:

A. obtaining, by the terminal, a quality parameter of a received signal, a receiving power of a code channel occupied by the terminal and powers of code channels in a cell having the same carrier frequency and the same time slot as those of the code channel occupied by the terminal respectively, according to a received signal quality;

B. determining a minimum receiving power which is permitted by the code channel occupied by the terminal according to the powers of the code channels in the cell having the same carrier frequency and the same time slot as those of the code channel occupied by the terminal; and C. generating a power control command according to a determined minimum receiving power, the receiving power of the code channel occupied by the terminal and the quality parameter of the received signal.

The step B includes:

preconfiguring or predesignating via a signaling, a power difference threshold between different code channels;

obtaining a maximum code channel power in the cell having the same carrier frequency and the same time slot as those of the code channel occupied by the terminal; and taking a difference between the maximum code channel power and the power difference threshold between different code channels as the minimum receiving power which is permitted by the code channel occupied by the terminal.

When the receiving power of the code channel occupied by the terminal is lower than or equal to the minimum receiving power which is permitted, a command for increasing a transmit power is generated; and when the receiving power of the code channel occupied by the terminal is greater than the minimum receiving power which is permitted by the code channel occupied by the terminal, the power control command is generated according to the quality parameter of the received signal and a configured quality parameter target value.

When the receiving power of the code channel occupied by the terminal is greater than the minimum receiving power which is permitted by the code channel occupied by the terminal, if the quality parameter of the received signal is greater than the quality parameter target value, a command for decreasing the transmit power is generated; and if the quality parameter of the received signal is lower than or equal to the quality parameter target value, a command for increasing the transmit power is generated.

When the quality of the received signal is in a certain range, a power control module is permitted to generate a command for requesting the transmit not to adjust the transmit power; if the receiving power of the code channel occupied by the terminal is equal to the minimum receiving power which is permitted, the power control command is generated according to the quality parameter of the received signal and the configured quality parameter target value; and if the received power of the code channel occupied by the terminal is greater than the minimum receiving power which is permitted, the power control command is generated according to the quality parameter of the received signal, the configured quality parameter target value and a configured quality change threshold.

When the received power of the code channel occupied by the terminal is equal to the minimum receiving power which is permitted, if the quality parameter of the received signal is greater than the quality parameter target value, a command for not adjusting the transmit power is generated; and if the quality parameter of the received signal is lower than or equal to the quality parameter target value, the command for increasing the transmit power is generated.

When the receiving power of the code channel occupied by the terminal is greater than the minimum receiving power which is permitted by the code channel occupied by the terminal, if the quality parameter of the received signal is greater than the quality parameter target value by a first predetermined threshold, the command for decreasing the transmit power is generated;

if the quality parameter of the received signal is lower than the quality parameter target value by a second predetermined threshold, the command for increasing the transmit power is generated;

otherwise, a command for not adjusting the transmit power is generated.

Wherein, the first predetermined threshold is equal to the second predetermined threshold.

The quality parameter of the received signal includes: a signal-to-interfere ratio before a signal demodulation, a signal-to-noise ratio after the signal demodulation, and the signal receiving power.

As described above, in the present invention, when a terminal measures or estimates the quality of a received signal, powers of all the code channels occupying the same carrier frequency and the same time slot is estimated, and the lower limit of the code channel power of the terminal is determined according to the powers of the code channels, and then the lower limit of the code channel power, the signal-to-noise ratio (such as a signal-to-noise ratio before a demodulation and a signal-to-noise ratio after the demodulation) representing the quality of the received signal or the signal receiving power are combined to generate a power control command. Thus, the transmit power of the code channels of the same carrier frequency and the same time slot may be equilibrated, and it may be prevented that the demodulation performance of the signal from being influenced due to a large signal difference between different code channels received by the terminal. Therefore, according to the present invention, the needed signal may be demodulated by the terminal correctly when the signal power of the current code channel is small. As a result, the quality of the communication may be guaranteed, and the possibility of the wireless link out-of-synchronization and even off-line may be lowered. In addition, because the signal power of the code channel may be very small, no great interference will be caused on other users an d no great influence will be laid on the system capacity when the transmit power of the signal is raised appropriately.

DETAILED DESCRIPTION OF THE EMBODIMENTS

The concept of the present invention is as follows: when a mobile communication system performs an inner loop power control, a terminal limits the power difference between all the code channels of the same carrier frequency and the same time slot, and the signal powers of different code channels are equilibrated. When the quality of the received signal is measured, powers of all the code channels occupying the same carrier frequency and the same time slot are estimated, and the lower limit of the code channel power of the terminal is determined according to the powers of the code channels, and then a power control command is generated by combining the lower limit of the code channel power and the signal-to-noise ratio representing the quality of the received signal (a signal-to-noise ratio before or after a demodulation) or the signal receiving power.

The power control process of the present invention is a closed loop control process. Therefore, to better understand the present invention, the closed loop control process of the prior art will be first illustrated simply.

In the prior art, a downlink power control command of the terminal is generated by using a parameter representing the quality of the received signal (such as a SIR before demodulation and an SNR after demodulation) or the received signal power.

Figure 1:
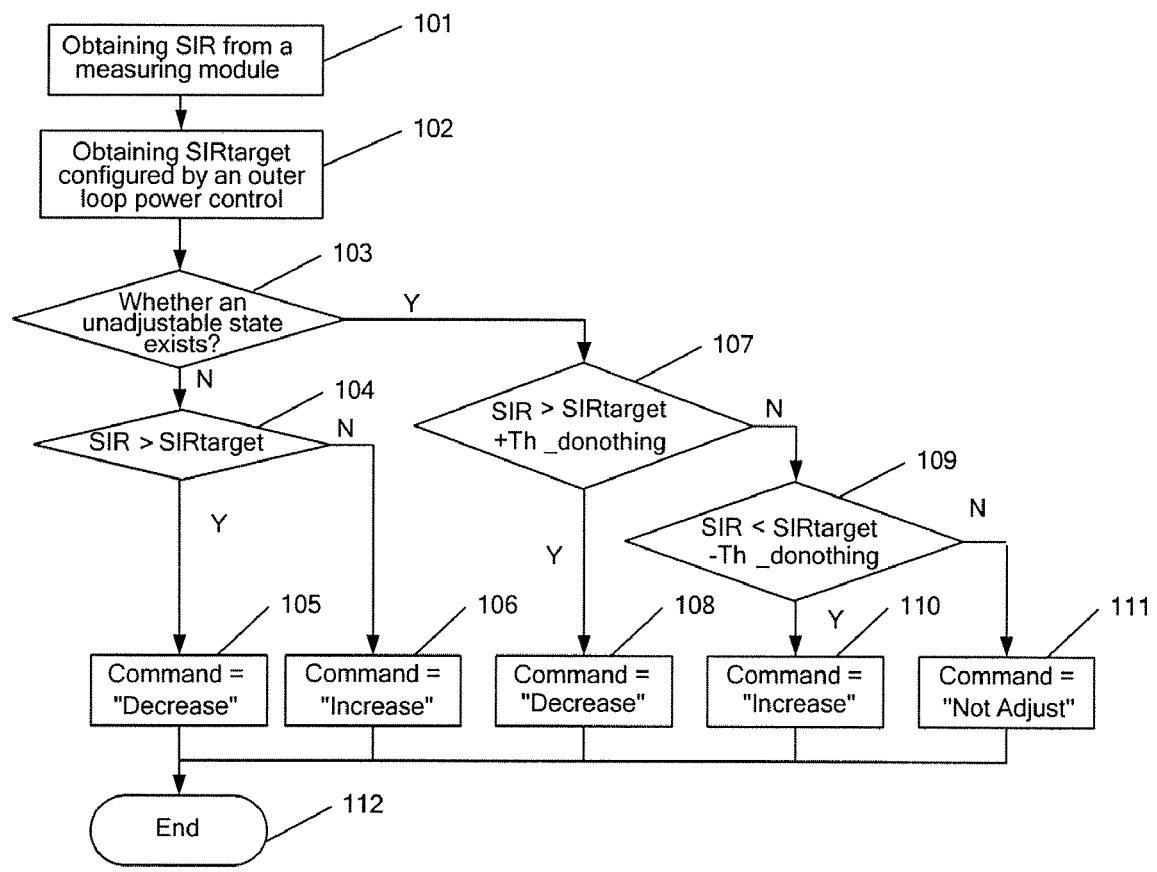
FIG. 1 is a flow chart of the process for generating a power control command in the prior art.

Taking the SIR before demodulation as an example, as shown in FIG. 1, the process for generating the downlink power control command of the terminal in the prior art includes the following steps.

Step 101: The SIR of the received signal is obtained from a measuring module.

Step 102: The SIR target value SIRtarget set by the outer loop power control is obtained.

Step 103: It is determined whether a state not needing adjustment exists.

If the state not needing adjustment does not exist, turn to Step 104 for determining whether the SIR is greater than the SIRtarget.

If SIR>SIRtarget, turn to Step 105 for generating the command for decreasing the transmit power; otherwise, turn to Step 106 for generating the command for increasing the transmit power.

If the state not needing adjustment exists, turn to Step 107 for determining whether the SIR is greater than the SIRtarget by a threshold Th_donothing, in other words, whether SIR>SIRtarget+Th_donothing.

If yes, turn to Step 108 for generating the command for decreasing the transmit power;

otherwise, turn to Step 109 for continuing to determine whether the SIR is lower than the SIRtarget by a threshold Th_donothing, in other words, whether SIR<SIRtarget−Th_donothing.

If yes, turn to Step 110 for generating the command for increasing the transmit power;

otherwise, turn to Step 111 for generating the command of not adjusting the transmit power.

Then, turn to Step 112 for ending.

The process for generating the power control command using the SNR after the demodulation or the received signal power is similar to the above process, and the description thereof will not be repeated.

In the present invention, during the inner loop power control process, the terminal comprehensively considers the received signal quality and the received signal powers of different code channels according to the target value set by the outer loop, and generates a power control command according to the parameters. Therefore, the influence on the terminal demodulation performance in the prior art, due to the fact that only the terminal receiving quality is considered while the signal power difference between different code channels is not considered, may be avoided.

The present invention will now be further illustrated in detail in conjunction with the drawings and the embodiments.

Figure 2:
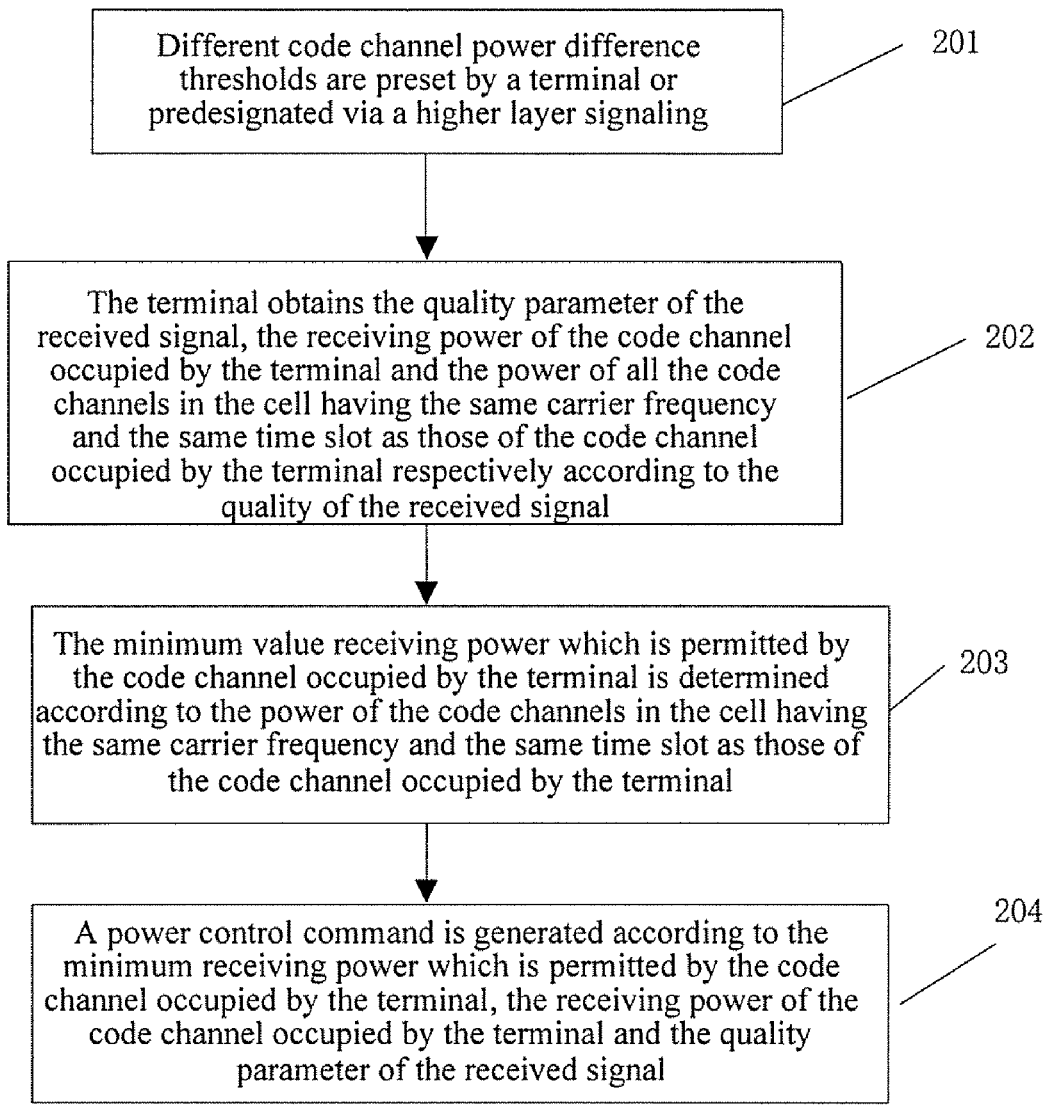
FIG. 2 is a flow chart of the method according to the present invention.

FIG. 2 shows the implementation of the method according to the present invention, including the following steps.

Step 201: Power difference threshold between different code channels are preset by a terminal or predesignated via a higher layer signaling.

Thus, the terminal may determine the minimum receiving power of the code channel of the terminal according to the threshold. For various reasons, the transmit power of the base station may be different for the same code channel each time. Therefore, for signals whose transmit power changes dynamically, no great influence will be laid on the demodulation performance of the terminal so long as it is guaranteed that the difference between the power of the terminal and the power of all the code channels in the cell having the same carrier frequency and the same time slot as those of the code channel occupied by the terminal does not exceed a predetermined threshold.

Step 202: The terminal obtains the quality parameter of the received signal, the receiving power of the code channel occupied by the terminal and the power of all the code channels in the current cell having the same carrier frequency and the same time slot as those of the code channel occupied by the terminal respectively according to the quality of the received signal.

The quality parameter of the received signal may be obtained by measuring the received signal, including a SIR of the received signal before demodulation, a SNR of the received signal after demodulation, a signal receiving power and a combination thereof.

The receiving power of the code channel occupied by the terminal and the power of all the code channels in the current cell having the same carrier frequency and the same time slot as those of the code channel occupied by the terminal may be estimated by using a physical layer measurement method.

Step 203: The minimum receiving power which is permitted by the code channel occupied by the terminal is determined according to the power of all the code channels in the current cell having the same carrier frequency and the same time slot as those of the code channel occupied by the terminal.

First of all, the maximum code channel power of all the code channels in the current cell having the same carrier frequency and the same time slot as those of the code channel occupied by the terminal is obtained; and the difference between the maximum code channel power and the power difference threshold between different code channels is taken as the minimum receiving power which is permitted by the code channel occupied by the terminal.

Step 204: A power control command is generated according to the minimum receiving power which is permitted by the code channel occupied by the terminal, the receiving power of the code channel occupied by the terminal and the quality parameter of the received signal.

As described above, during the determination process of the power control command to be generated, in addition to the comparison between the actually measured receiving power of the code channel occupied by the terminal and the minimum receiving power which is permitted by the code channel occupied by the terminal, the quality of the received signal also needs to be considered. The SIR of the received signal before demodulation, the SNR of the received signal after demodulation, the signal receiving power or a combination thereof may be compared with a target value configured by the outer loop power control. If it is greater than the target value, a command for decreasing the transmit power is generated; otherwise, a command for increasing the transmit power is generated. If the transmit power is unadjustable, in other words, if it is not allowed to adjust the transmit power when the signal quality is in a certain range around the target value, the command for decreasing the transmit power will be generated when the signal quality received actually is greater than the target value by a certain threshold; and a command for increasing the transmit power is generated when the signal quality received actually is less than the target value by a certain threshold; otherwise, a command for not changing the transmit power is generated. Then, the control command is sent to the base station via a control channel or in other ways, and the base station performs the corresponding adjustment in a step size designated via a higher layer signaling or predefined according to the received control command.

Taking the SIR before demodulation as an example, it will be described that the minimum received power which is permitted by the code channel occupied by the terminal, the receiving power of the code channel occupied by the terminal and the quality parameter of the received signal are combined to generate the power control command.

Before the control command is generated, the SIR, the received power Pr of the code channel occupied by the terminal and the maximum received power P_max in all the users occupying the same wireless resource need to be obtained via measurement or estimation. The minimum received power P_lower_limit which is permitted by the code channel occupied by the terminal is calculated according to the power difference threshold between different code channels Thres which are preconfigured.

During the power control of the mobile communication system, according to an actual requirement, the power control may only be permitted to increase and decrease the transmit power, or may also be permitted not to adjust the transmit power. Usually, after the system is started, the higher layer determines which mode is selected via the configuration command.

If the power control is only permitted to increase and decrease the transmit power, the terminal may only generate the command for decreasing the transmit power or the command for increasing the transmit power.

Figure 3:
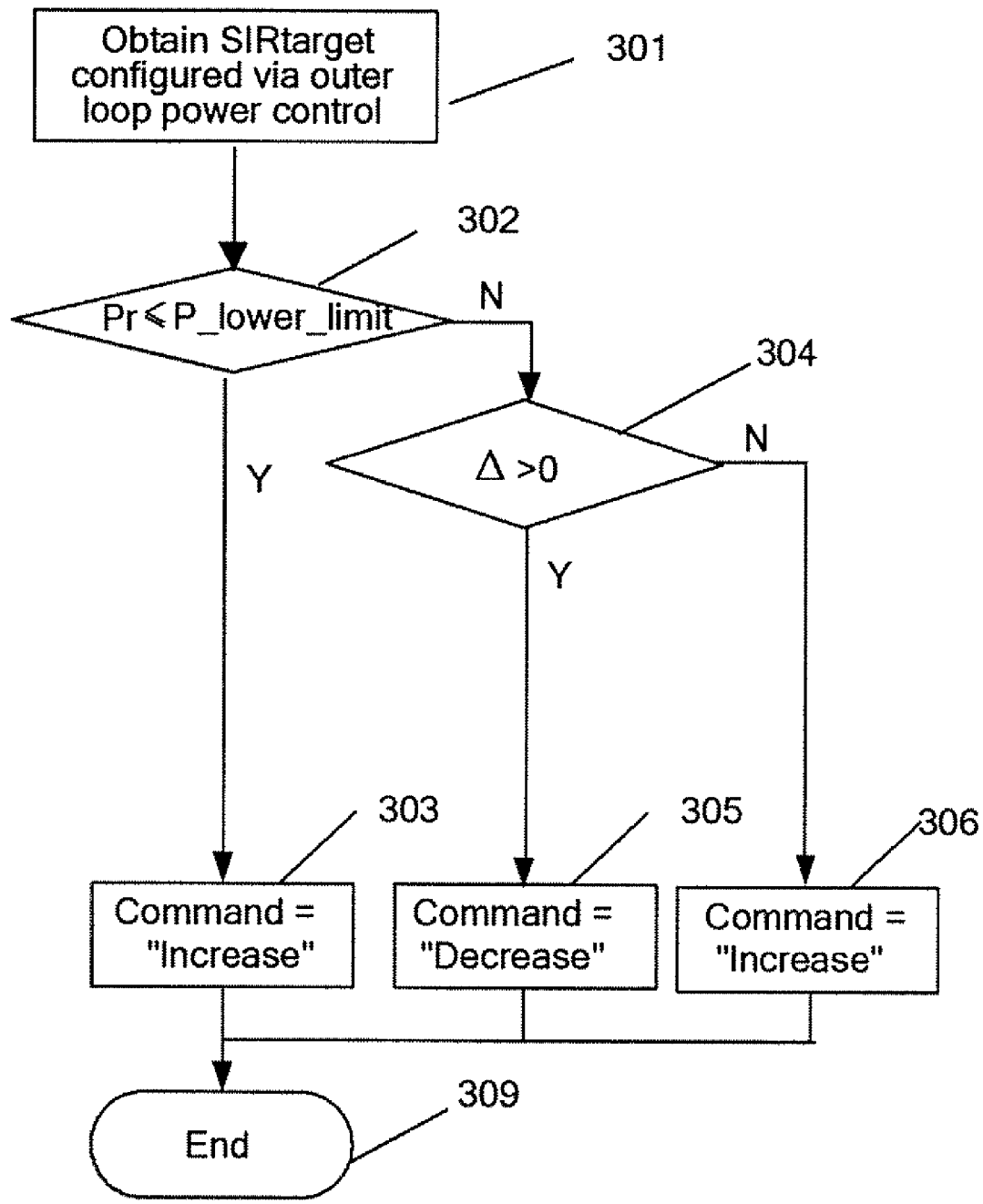
FIG. 3 is a flow chart of the process in which a terminal generates a power control command according to the method of the present invention.

In such a case, the process flow for generating the control command is as shown in FIG. 3.

Step 301: The SIRtarget configured by the outer loop power control is obtained.

For an easy implementation, it is assumed that Δ=SIR−SIRtarget in the following process.

Step 302: It is determined whether the receiving power Pr of the code channel occupied by the terminal is lower than or equal to the minimum receiving power P_lower_limit which is permitted by the code channel occupied by the terminal.

If Pr≦P_lower_limit, the flow turns to Step 303, that is, the command for increasing the transmit power is generated.

Otherwise, the flow turns to Step 304, that is, it is further determined whether the SIR is greater than the SIRtarget, i.e., whether Δ is greater than 0.

If Δ>0, the flow turns to Step 305, that is, a command for decreasing the transmit power is generated.

Otherwise, the flow turns to Step 306, that is, a command for increasing the transmit power is generated.

After the above power control commands are generated, the flow turns to Step 307, that is, the current process for generating the control command is completed.

If the power control is permitted to not adjust the transmit power, the terminal may generate the command for decreasing the transmit power, or the command for increasing the transmit power, or the command for not adjusting the transmit power.

In this case, the power control command is generated according to the SIR of the terminal, the SIRtarget, the receiving power Pr of the code channel occupied by the terminal and the minimum receiving power P_lower_limit which is permitted by the code channel occupied by the terminal.

The process for generating the power control command is as follows:

When the receiving power Pr of the code channel occupied by the terminal is lower than the minimum receiving power P_lower_limit which is permitted by the code channel occupied by the terminal, the command for increasing the transmit power is generated;

When the receiving power Pr of the code channel occupied by the terminal is equal to the minimum receiving power P_lower_limit which is permitted by the code channel occupied by the terminal, whether to increase the transmit power or not is determined according to the SIR and the SIRtarget. Specifically, if SIR<SIRtarget, the command for increasing the transmit power is generated; otherwise, the command for not adjusting the transmit power is generated.

When the receiving power Pr of the code channel occupied by the terminal is greater than the minimum receiving power P_lower_limit which is permitted by the code channel occupied by the terminal, the power control command is generated as follows.

1. If the SIR is greater than the SIRtarget by a first predetermined threshold Th_1, the command for decreasing the transmit power is generated.

2. If the SIR is lower than the SIRtarget by a second predetermined threshold Th_2, the command for increasing the transmit power is generated.

3. Otherwise, a command for not adjusting the transmit power is generated.

Figure 4:
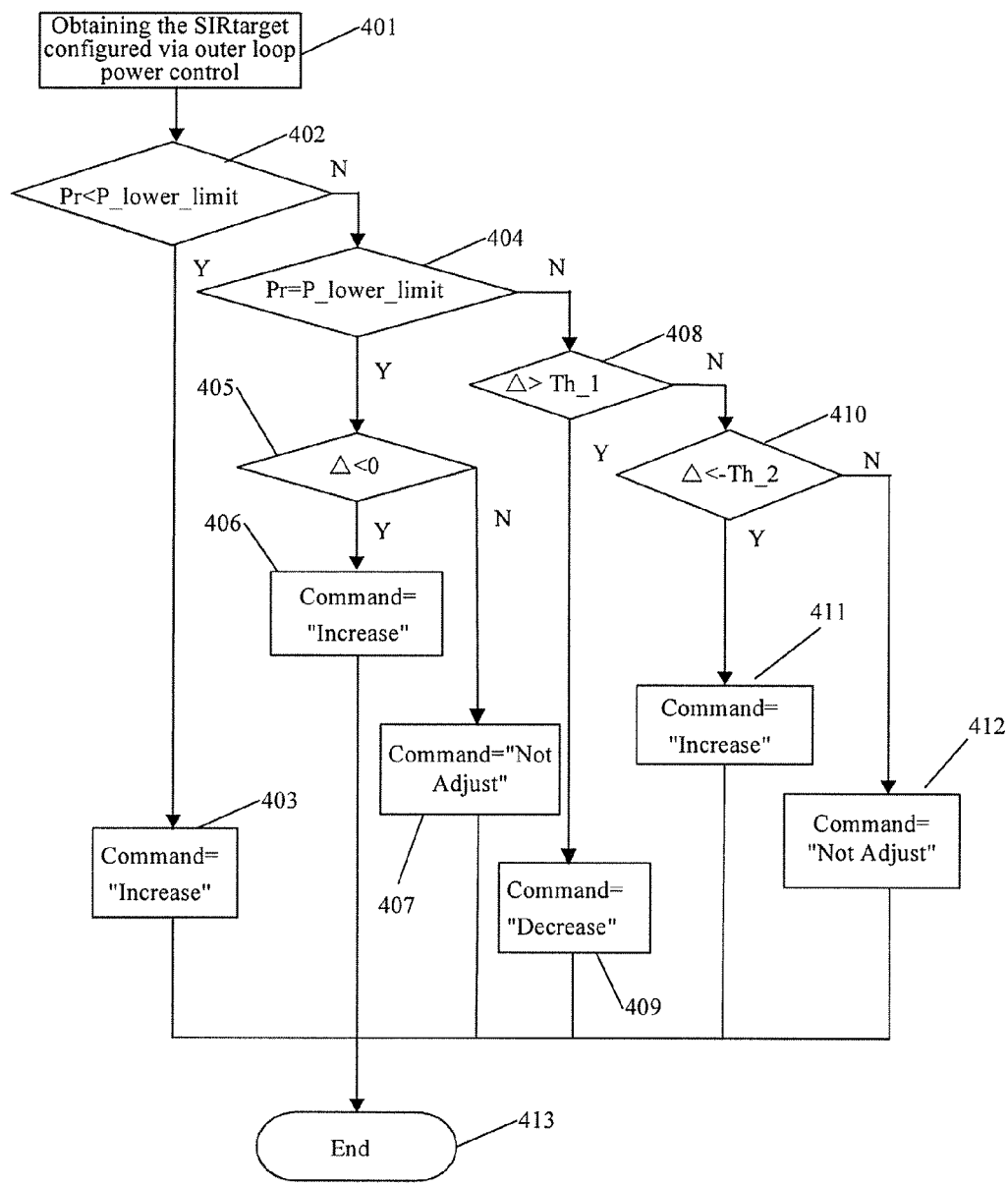
FIG. 4 is a flow chart of the process in which a terminal generates a power control command according to the method of the present invention.

The process flow for generating the above power control commands is shown in FIG. 4:

Step 401: The SIRtarget configured by the outer loop power control is obtained.

For an easy implementation, it is also assumed that Δ=SIR−SIRtarget in the following process.

Step 402: It is determined whether the receiving power Pr of the code channel occupied by the terminal is lower than or equal to the minimum receiving power P_lower_limit which is permitted by the code channel occupied by the terminal.

If Pr<P_lower_limit, the flow turns to Step 403, that is, the command for increasing the transmit power is generated.

Otherwise, the flow turns to Step 404, that is, it is further determined whether the receiving power Pr of the code channel occupied by the terminal is equal to the minimum receiving power P_lower_limit which is permitted by the code channel occupied by the terminal.

If Pr=P_lower_limit, the flow turns to Step 405, that is, it is further determined whether the SIR is lower than the SIRtarget.

If SIR<SIRtarget, i.e., Δ<0, the flow turns to Step 406, that is, the command for increasing the transmit power is generated.

Otherwise, the flow turns to Step 407, that is, the command for not adjusting the transmit power is generated.

If Pr>P_lower_limit, the flow turns to Step 408, that is, it is further determined whether the SIR is greater than the SIRtarget by the first predetermined threshold Th_1.

If SIR>SIRtarget+Th_1, i.e., Δ>Th_1, the flow turns to Step 409, that is, the command for decreasing the transmit power is generated.

Otherwise, the flow turns to Step 410, that is, it is further determined whether the SIR is lower than the SIRtarget by the second predetermined threshold Th_2.

If SIR<SIRtarget−Th_2, i.e., Δ<−Th_2, the flow turns to Step 411, that is, the command for increasing the transmit power is generated.

Otherwise, when the conditions in Step 408 and Step 410 are not met, the flow turns to Step 412, that is, the command for not adjusting the transmit power is generated.

After the above power control commands are generated, the flow turns to Step 413, that is, the current process for generating the control command is completed.

To further simplify the process, the first predetermined threshold Th_1 may be equal to the second predetermined threshold Th_2.

In practical applications, any combination of the signal quality parameters SIR, SNR and signal power may be considered. When the power of the code channel occupied by the terminal is lower than the maximum receiving power of other code channels by a certain value, the control command for requesting the base station to decrease the transmit power will not be generated. When the power of the code channel occupied by the terminal is greater than the maximum receiving power of other code channels by a certain value, a corresponding control command will be generated in conjunction with the signal quality parameters SIR, SNR and the signal power. The process for generating the control command is similar to the above process, and a repeat description thereof is omitted.

Thus, the present invention may solve the problem in the CDMA system that the power difference between code channels may be too large because the downlink power control technology is used. Therefore, the communication quality may be guaranteed.

The present invention is applicable for all the wireless communication systems employing CDMA technology, such as TD-SCDMA (Time Division-Synchronous CDMA), WCDMA (Wideband CDMA), CDMA2000 and IS95. Moreover, the present invention is also applicable for other communication systems in which the quality of the received signal may be influenced by a large power level difference.

Additional advantages and modifications will readily occur to those skilled in the art. Therefore, the present invention in its broader aspects is not limited to the specific details and representative embodiments shown and described herein. Accordingly, various modifications and variations may be made without departing from the spirit or scope of the present invention as defined by the appended claims and their equivalents.

The invention claimed is:

1. A terminal power control method, comprising:
   A. obtaining, by a terminal, a quality parameter of a received signal, receiving power of a code channel occupied by the terminal and powers of code channels in a cell having the same carrier frequency and the same time slot as those of the code channel occupied by the terminal respectively, according to a received signal quality;
   B. determining a minimum receiving power which is permitted by the code channel occupied by the terminal according to the power of the code channels in the cell having the same carrier frequency and the same time slot as those of the code channel occupied by the terminal wherein the determining includes preconfiguring or pre-designating, via a signaling, a power difference threshold between different code channels;
      obtaining a maximum code channel power in the cell having the same carrier frequency and the same time slot as those of the code channel occupied by the terminal; and
      taking a difference between the maximum code channel power and the power difference threshold between different code channels as the minimum receiving power which is permitted by the code channel occupied by the terminal; and
   C. generating a power control command according to a determined minimum receiving power, the receiving power of the code channel occupied by the terminal and the quality parameter of the received signal.

2. The method according to claim 1, wherein:
   when the receiving power of the code channel occupied by the terminal is lower than or equal to the minimum receiving power which is permitted, generating a command for increasing a transmit power; and
   when the receiving power of the code channel occupied by the terminal is greater than the minimum receiving power which is permitted by the code channel occupied by the terminal, generating the power control command according to the quality parameter of the received signal and a configured quality parameter target value.

3. The method according to claim 2, wherein, when the receiving power of the code channel occupied by the terminal is greater than the minimum receiving power which is permitted by the code channel occupied by the terminal,
   if the quality parameter of the received signal is greater than the quality parameter target value, generating a command for decreasing the transmit power; and
   if the quality parameter of the received signal is lower than or equal to the quality parameter target value, generating a command for increasing the transmit power.

4. The method according to claim 1, wherein, when the quality of the received signal is in a certain range, a power control module is permitted to generate a command for requesting a transmit end not to adjust the transmit power;
   if the receiving power of the code channel occupied by the terminal is equal to the minimum receiving power which is permitted, generating the power control command according to the quality parameter of the received signal and the configured quality parameter target value; and
   if the received power of the code channel occupied by the terminal is greater than the minimum receiving power which is permitted, generating the power control command according to the quality parameter of the received signal, the configured quality parameter target value and a configured quality change threshold.

5. The method according to claim 4, wherein, when the received power of the code channel occupied by the terminal is equal to the minimum receiving power which is permitted,
   if the quality parameter of the received signal is greater than the quality parameter target value, generating a command for not adjusting the transmit power; and
   if the quality parameter of the received signal is lower than or equal to the quality parameter target value, generating the command for increasing the transmit power.

6. The method according to claim 4, wherein, when the receiving power of the code channel occupied by the terminal is greater than the minimum receiving power which is permitted by the code channel occupied by the terminal:
- if the quality parameter of the received signal is greater than the quality parameter target value by a first predetermined threshold, generating the command for decreasing the transmit power;
- if the quality parameter of the received signal is lower than the quality parameter target value by a second predetermined threshold, generating the command for increasing the transmit power;

otherwise, generating a command for not adjusting the transmit power.

7. The method according to claim 6, wherein, the first predetermined threshold is equal to the second predetermined threshold.

8. The method according to claim 1, wherein, the quality parameter of the received signal comprises: a signal-to-interfere ratio before a signal demodulation, a signal-to-noise ratio after the signal demodulation, and the signal receiving power.

* * * * *